(12) United States Patent
Wright et al.

(10) Patent No.: US 10,160,387 B2
(45) Date of Patent: Dec. 25, 2018

(54) LOCATING SYSTEM FOR VEHICLE LOAD FLOOR PANEL MEASUREMENT

(71) Applicants: Jacob Wright, Rochester Hills, MI (US); Eric Clara, Algonac, MI (US); Nicholas D Kappler, Waterford, MI (US); Jeffrey D Sutherland, Ortonville, MI (US); Donald L Wilson, Jr., Goodrich, MI (US); Eric A Marsh, Macomb, MI (US); John H Pray, Shelby Township, MI (US); Joseph J Swailes, Oxford, MI (US); Kazimiera Borek, Macomb, MI (US)

(72) Inventors: Jacob Wright, Rochester Hills, MI (US); Eric Clara, Algonac, MI (US); Nicholas D Kappler, Waterford, MI (US); Jeffrey D Sutherland, Ortonville, MI (US); Donald L Wilson, Jr., Goodrich, MI (US); Eric A Marsh, Macomb, MI (US); John H Pray, Shelby Township, MI (US); Joseph J Swailes, Oxford, MI (US); Kazimiera Borek, Macomb, MI (US)

(73) Assignee: FCA US LLC, Auburn Hills, MI (US)

( * ) Notice: Subject to any disclaimer, the term of this patent is extended or adjusted under 35 U.S.C. 154(b) by 260 days.

(21) Appl. No.: 15/291,171

(22) Filed: Oct. 12, 2016

(65) Prior Publication Data
US 2018/0099616 A1 Apr. 12, 2018

(51) Int. Cl.
*B60R 5/04* (2006.01)
*B32B 37/10* (2006.01)
(Continued)

(52) U.S. Cl.
CPC ............ *B60R 5/044* (2013.01); *B29C 33/123* (2013.01); *B29C 43/18* (2013.01); *B29C 43/361* (2013.01); *B32B 27/40* (2013.01); *B32B 37/10* (2013.01); *B60R 5/04* (2013.01); *B60R 13/011* (2013.01); *B29C 43/183* (2013.01); *B29C 2043/189* (2013.01); *B29C 2043/3602* (2013.01); *B29C 2043/3613* (2013.01); *B29K 2075/00* (2013.01); *B29L 2031/3017* (2013.01);
(Continued)

(58) Field of Classification Search
CPC ......... B60R 5/044; B60R 5/04; B60R 13/011; B29C 43/18; B29C 43/361; B32B 27/40; B32B 37/10
USPC ...................... 296/187.08, 193.07, 37.3, 191
See application file for complete search history.

(56) References Cited

U.S. PATENT DOCUMENTS

| 6,102,464 A | 8/2000 | Schneider et al. |
| 6,482,508 B1 | 11/2002 | Persson |

(Continued)

*Primary Examiner* — Joseph D. Pape
(74) *Attorney, Agent, or Firm* — Ralph E Smith

(57) ABSTRACT

A compression molded vehicle floor panel includes a main body formed by compression molding and having a first side and an opposed second side, and at least one separately formed measurement locating member at least partially encapsulated in the main body during the compression molding. The measurement locating member defines a cavity having an open end at the first side of the main body. The cavity is configured to receive a locator pin of a measurement fixture to locate the compression molded vehicle floor panel in the measurement fixture for measurement of the compression molded vehicle floor panel.

17 Claims, 5 Drawing Sheets

(51) Int. Cl.
  *B32B 27/40*  (2006.01)
  *B29C 33/12*  (2006.01)
  *B29C 43/18*  (2006.01)
  *B29C 43/36*  (2006.01)
  *B60R 13/01*  (2006.01)
  *B29K 75/00*  (2006.01)
  *B29L 31/30*  (2006.01)

(52) U.S. Cl.
  CPC ....... *B32B 2375/00* (2013.01); *B32B 2605/00* (2013.01); *B60R 2013/016* (2013.01)

(56) References Cited

U.S. PATENT DOCUMENTS

| | | |
|---|---|---|
| 6,843,525 B2 | 1/2005 | Preisler |
| 7,066,532 B2 | 6/2006 | Schoemann |
| 8,696,048 B2 | 4/2014 | Griffin et al. |
| 8,808,835 B2 | 8/2014 | Preisler et al. |
| 9,346,375 B2 * | 5/2016 | Preisler .................... B60N 2/91 |
| 9,707,725 B2 * | 7/2017 | Preisler .................... B29C 70/46 |
| 2008/0185866 A1 | 8/2008 | Tarrant et al. |
| 2013/0278018 A1 | 10/2013 | Preisler et al. |
| 2013/0278019 A1 * | 10/2013 | Preisler .................... B60R 5/04 |
| | | 296/193.07 |
| 2013/0278020 A1 | 10/2013 | Preisler et al. |

* cited by examiner

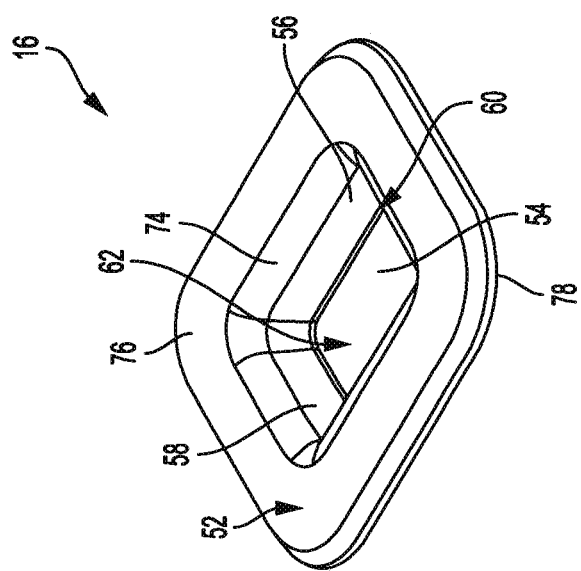
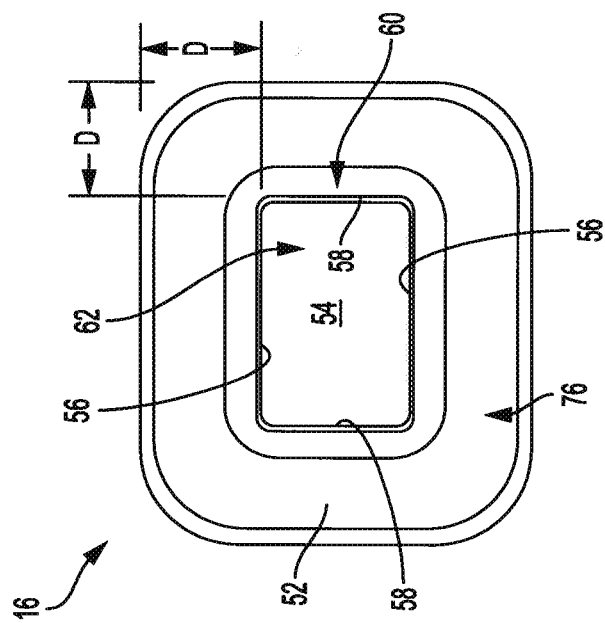
FIG. 3
FIG. 4

US 10,160,387 B2

LOCATING SYSTEM FOR VEHICLE LOAD FLOOR PANEL MEASUREMENT

FIELD

The present application relates generally to molded components and, more particularly, to a vehicle floor panel having integrally molded locating components for precise measuring of the vehicle floor panel.

BACKGROUND

Many vehicles typically include load floors to support cargo loads. Such load floors were historically made from thick sheet metal or wood fiber materials to support these cargo loads. However, the thick materials were often heavy, which reduced vehicle fuel economy. In an effort to reduce vehicle weight, load bearing vehicle structures have been formed in collapsible molding tools from lighter weight materials such as thermosetting plastic composites. However, it has been difficult to assure the composite load floors are within design tolerances using conventional measurement techniques. Moreover, as the molding tool wears over time, the dimensions of the composite load floors may further exceed their design tolerances. Accordingly, while such systems have worked well for their intended purpose, it is desirable to improve measurement of lightweight vehicle components.

SUMMARY

In one exemplary aspect of the invention, a compression molded vehicle floor panel is provided. In one exemplary implementation, the vehicle floor panel includes a main body formed by compression molding and having a first side and an opposed second side, and at least one separately formed measurement locating member at least partially encapsulated in the main body during the compression molding. The measurement locating member defines a cavity having an open end at the first side of the main body. The cavity is configured to receive a locator pin of a measurement fixture to locate the compression molded vehicle component in the measurement fixture for measurement of the compression molded vehicle component.

In another exemplary aspect of the invention, a method of manufacturing a compression molded vehicle component is provided. In one exemplary implementation, the method includes providing a main body having a first side and a second side, providing at least one measurement locating member defining a cavity, and compression molding the main body and at least partially encapsulating the least one measurement locating member in the main body during the forming of the main body by compression molding to thereby form the compression molded component. The measurement locating member is located such that the cavity includes an open end disposed at the first side of the main body. The method further includes loading the compression molded component into a measurement fixture having at least one locator pin such that the at least one measurement locating member receives the at least one locator pin, and measuring dimensions of the compression molded component while the compression molded component is loaded in the measurement fixture and located on the at least one locator pin.

BRIEF DESCRIPTION OF DRAWINGS

FIG. 3 is a bottom view of an example measurement locating member coupled to the load floor panel shown in FIG. 2 in accordance with the principles of the present disclosure;

FIG. 4 is a perspective view of the measurement locating member shown in FIG. 3 in accordance with the principles of the present disclosure;

Further areas of applicability of the teachings of the present application will become apparent from the detailed description, claims and the drawings. It should be understood that the detailed description, including disclosed embodiments and drawings referenced therein, are merely exemplary in nature intended for purposes of illustration only and are not intended to limit the scope of the present application, its application or uses. Thus, variations that do not depart from the gist of the present application are intended to be within the scope of the present application.

DESCRIPTION

Vehicle rear cargo areas often include a load floor panel movable to provide access to a location where cargo such as a spare tire may be stored. In order for the floor panel to operate properly without interference with surrounding structures, the floor panel must be within predefined dimensional tolerances. In order to improve measurement speed and accuracy, one or more measurement locating members are molded into the load floor. As such, the load floor panel includes integrally molded measurement locating members in the same location for each manufactured floor panel. This enables the floor panel to be held in a measurement fixture by the locating members such that the floor panel is held in the same way every time. As a result, a faster and more robust way to measure the floor panel is provided to ensure the part meets quality standards.

While a movable load floor panel is described herein, it will be appreciated that the described measurement locating members may be utilized with any suitable molded component such as, for example, molded structural vehicle components.

Figure 1:
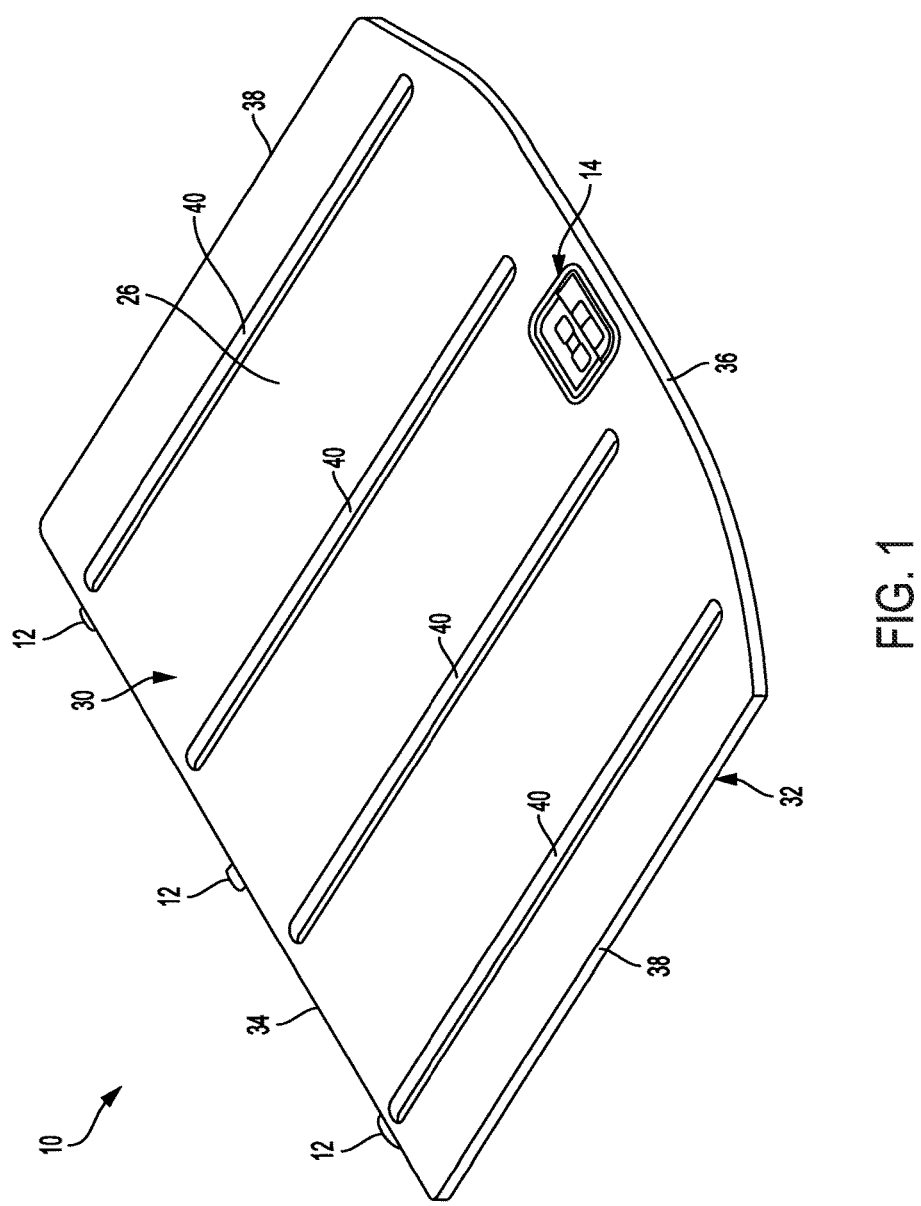
FIG. 1 is a top perspective view of an example vehicle load floor panel in accordance with the principles of the present disclosure.
Figure 2:
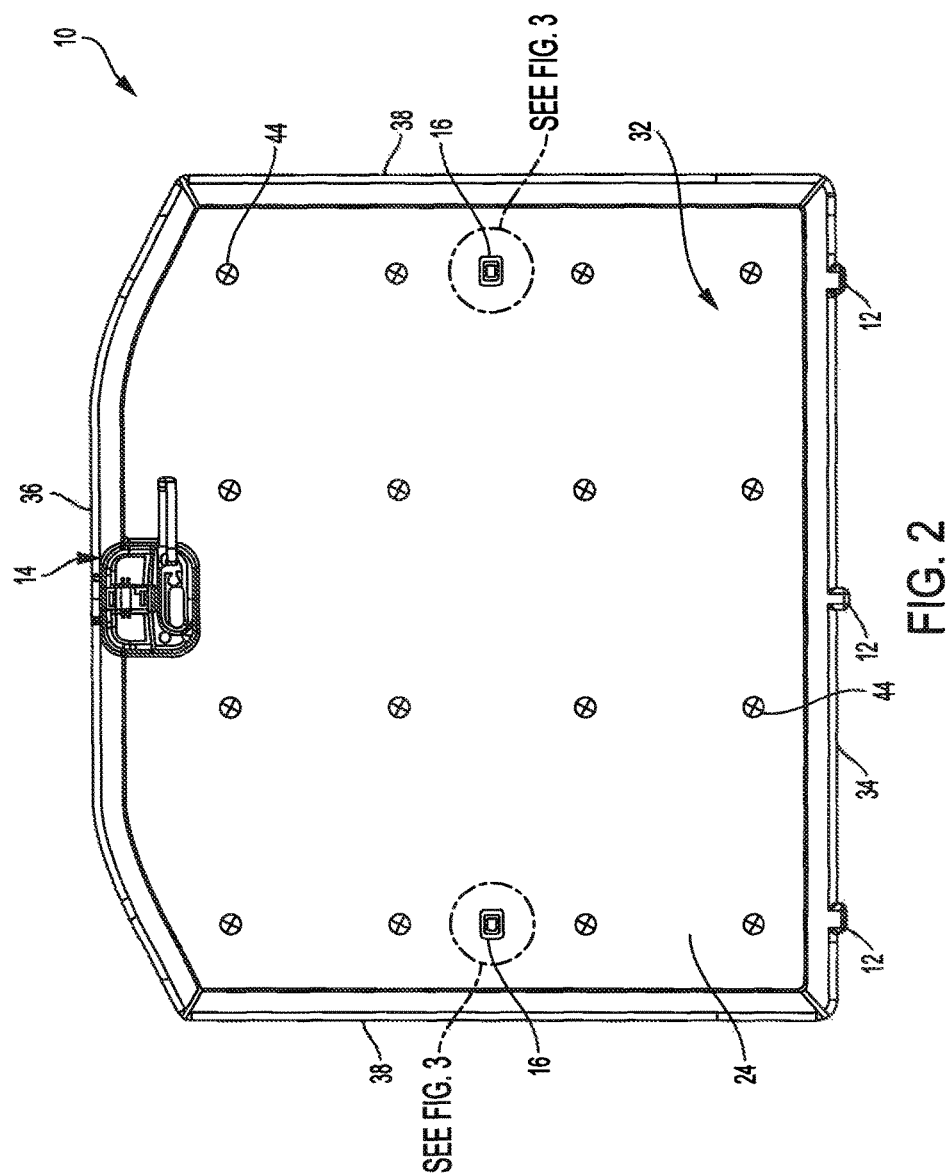
FIG. 2 is a bottom view of the load floor panel shown in FIG. 1 in accordance with the principles of the present disclosure.

With initial reference to FIGS. 1 and 2, an example load floor panel for a vehicle rear cargo area is illustrated and generally identified at reference numeral 10. The load floor panel 10 is configured to cover a tire storage compartment such as a spare tire storage compartment (not shown). When in place within a load floor frame (not shown), the load floor panel 10 is flush with a floor of the rear cargo area (not shown) surrounding the storage compartment and forms a portion of the floor of the rear cargo area.

In the example embodiment, load floor panel 10 includes a plurality of tabs 12 and a latch assembly 14 configured to facilitate coupling the load floor panel 10 to the load floor frame. The tabs 12 are configured to be received within apertures (not shown) formed in the load floor frame, and the latch assembly 14 is configured to releasably secure to a portion of the load floor frame. In this way, load floor panel 10 functions as a movable door to provide selective access to the storage compartment.

In the example embodiment, load floor panel 10 is a planar or generally planar panel formed from a composite spray molding (CSM) manufacturing process to include a plurality of integrally molded measurement locating members 16, as described herein in more detail.

Figure 6:
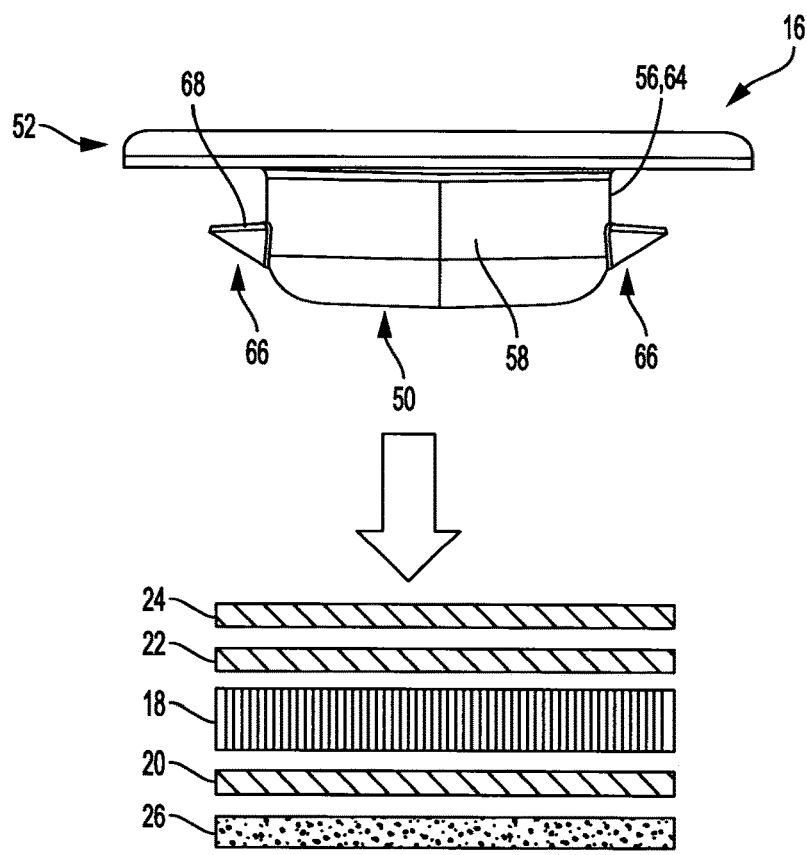
FIG. 6 is another side view of the measurement locating member shown in FIG. 3 in accordance with the principles of the present disclosure.

For example, as shown in FIG. 6, load floor panel 10 is fabricated from a plurality of layers including a substrate layer 18, an upper layer 20, a lower layer 22, a scrim layer 24, and a top show layer 26. However, it will be appreciated that load floor panel 10 may be formed by any suitable manufacturing process that enables measurement locating members to be integrated therein during the forming process.

As illustrated in FIGS. 1 and 2, load floor panel 10 generally includes an outer surface 30, an opposite inner surface 32, a forward edge 34, a rearward edge 36, and opposed side edges 38. Outer surface 30 is configured be flush with the floor of the rear cargo area when the load floor panel 10 is in a closed position within the load floor frame. Outer surface 30 may include one or more laterally extending cargo rails 40 that generally extend from forward edge 34 to rearward edge 36. In the example embodiment, forward edge 34 is located toward a front of the vehicle, and rearward edge 36 is located toward a rear of the vehicle. Laterally extending cargo rails 40 are configured to facilitate sliding and directing cargo along load floor panel 10. In alternative embodiments, outer surface 30 may be covered by carpet instead of cargo rails 40.

Inner surface 32 is configured to face toward the storage compartment when the load floor panel 10 is in the closed position within the load floor frame. In the example embodiment, inner surface 32 is at least partially defined by scrim layer 24 and is surrounded by a rim or frame 42 of folded-over material from outer surface 30. A plurality of fastener caps 44 are coupled to inner surface 32 and configured to conceal fasteners (not shown) that couple cargo rails 40 to outer surface 30. Inner surface 32 also includes measurement locating members 16, which are integrated into load floor panel 10 during manufacturing, as described herein in more detail.

Forward edge 34 is configured to be positioned toward a front of the vehicle and includes the plurality of tabs 12 extending therefrom. The plurality of tabs 12 are configured to be received within the windows of the load floor panel frame such that the tabs and windows may temporarily function as a hinge, but enable the load floor panel 10 to be completely removed from the rear cargo area.

With further reference to FIGS. 3-6, measurement locating members 16 will be described in more detail. Each measurement locating member 16 is generally cup-shaped and includes a base or main body portion 50 and a lip or flange 52 extending therefrom. In one example embodiment, measurement locating members 16 are fabricated using an injection molding process. However, locating members 16 may be formed from other materials and/or processes such as, for example, stamped or extruded metals.

In the example embodiment, main body portion 50 includes a closed end wall 54, a first pair of opposed side walls 56, a second pair of opposed side walls 58, and an open end 60. In this way, walls 54, 56, 58 define a cavity 62 configured to receive a pin (not shown). This enables measurement locating members 16 to be positioned during forming of the load floor panel 10 as well as to position the load floor panel 10 in the measurement fixture, as described herein in more detail.

In the illustrated embodiment, cavity 62 is shown as a rectangular or generally rectangular cavity. However, it will be appreciated that cavity 62 can have various other sizes and shapes configured to receive various sized and shaped features of various molding tools and measurement fixtures. As such, cavity 62 can be adapted for use with a wide range of devices or fixtures.

Figure 5:
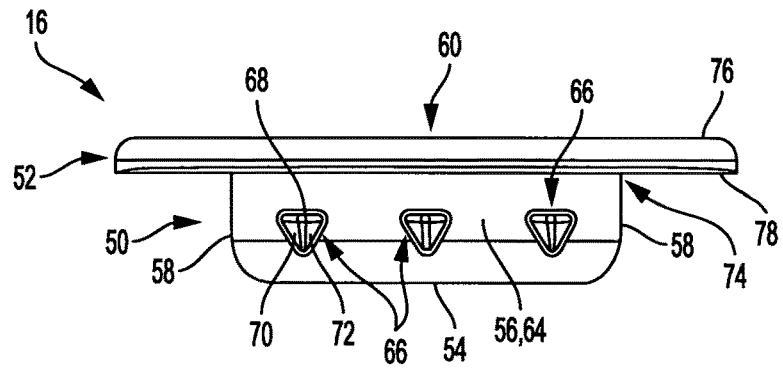
FIG. 5 is a side view of the measurement locating member shown in FIG. 3 in accordance with the principles of the present disclosure.

As shown in FIGS. 5 and 6, opposed side walls 56 each include an outer surface 64 with retaining fingers or features 66 extending outwardly therefrom. Retaining features 66 are encapsulated within floor panel 10 and configured to facilitate retaining locating members 16 within the load floor panel 10 and prevent their separation and removal therefrom. In the example embodiment, each retaining feature 66 is generally pyramidal and includes a first surface 68, a second surface 70, and a third surface 72. As illustrated, first surface 68 is arranged perpendicular to or substantially perpendicular to outer surface 64 and parallel to or substantially parallel to inner surface 32. As such, the perpendicular orientation of first surface 68 increases the force required to remove locating member 16 from the load floor panel 10.

In the illustrated embodiment, each side wall 56 includes three retaining features 66. However, each side wall 56 may have any suitable number of retaining features 66 that enables measurement locating member 16 to function as described herein. In other embodiments, opposed sidewalls 58 may additionally or alternatively include one or more of retaining features 66. Moreover, it will be appreciated that retaining features 66 are not limited to the described pyramidal shape and retaining features 66 may have any suitable shape that facilitates retention of locating member within load floor panel 10.

Flange 52 extends outwardly from an upper end 74 of side walls 56, 58 and includes an outer surface 76 and an inner surface 78. As shown in FIG. 6, inner surface 78 is disposed flush or substantially flush with load floor panel inner surface 32. In the example embodiment, flange 52 extends from a perimeter of side walls 56, 58 a predetermined distance 'D' to conceal any imperfections or material that escapes when locating member 16 is pressed into unfinished load floor panel 10 before or during a compression molding step.

Figure 7:
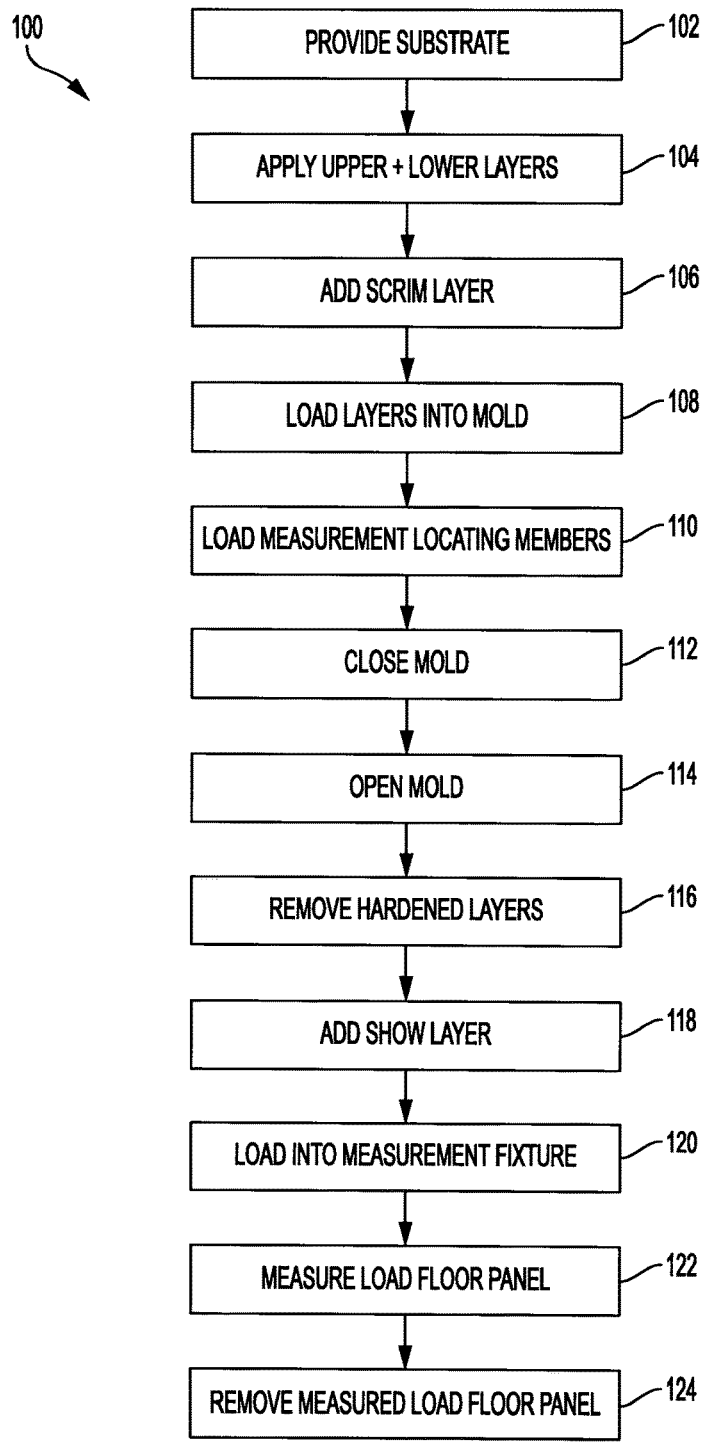
FIG. 7 is a schematic diagram illustrating an example method of manufacturing the load floor panel shown in FIG. 1, in accordance with the principles of the present disclosure.

FIG. 7 illustrates a method 100 of manufacturing load floor panel 10 that begins by providing substrate layer 18 at step 102. Substrate layer 18 may be, for example, a honeycomb shaped core of one or more materials such as paper, wood, plastic, metal, polystyrene, and polyurethane. At step 104, upper and lower layers 20, 22 are applied (e.g., sprayed) onto substrate layer 18. Upper and lower layers 20, 22 may be, for example, a lightweight fiber mat of polyurethane, fiberglass, carbon, and/or other fibrous materials. In other implementations, layers 18, 20, 22 may be replaced by an expandable foam.

At step 106, the scrim layer 24 is coupled (e.g., adhered) to lower layer 22. Scrim layer 24 may be, for example, fabric, leather, carpet, faux wood, polyester or plastic sheets, foil, polyethylene, or the like. In some implementations, scrim layer 24 undergoes a die cutting step (not shown) to cut apertures each sized to receive one measurement locating member 16. At step 108, layers 18, 20, 22, 24 are subsequently loaded into the compression molding tool. In one example, scrim layer 24 is oriented face-up in the compression molding tool.

At step 110, the measurement locating members 16 are loaded onto pins (not shown) disposed within the compression molding tool. In one example, cavity 62 is a complementary shape to the pin and is sized slightly smaller than the pin to create an interference fit to retain the locating members 16 on the pins. This enables locating members 16 to be disposed on pins that are located on an upper portion of the compression mold tool above the layers 18, 20, 22, 24.

At step 112, the compression mold tool is closed and the pins are lowered onto the layers 18, 20, 22, 24, thereby pressing the measurement locating members 16 first into scrim layer 24 and subsequently into layers 18, 20 and/or 22 until flange 52 is flush or substantially flush with inner surface 32. In this position, flange 52 is configured to conceal any material of upper layer 20 that escapes when locating member 16 is pressed therein. The compression step subsequently compresses, heats, and activates layers 20, 22 such that layers 18, 20, 22, 24 harden and form a unitary component with measurement locating members 16 encapsulated therein. As such, side walls 56, 58 and retaining features 66 of measurement locating members 16 are encapsulated in the floor panel 10 in the same location for each and every floor panel 10 produced. This enables floor panel 10 to be precisely located throughout the remainder of the manufacturing process and in the check fixtures (not shown). In one example, the check fixtures are a tool that holds and locates the floor panel 10 in the same way every time using locating members 16. This enables every load floor panel produced to be measured and compared with the each other, as well as the original design specifications.

At step 114, the molding tool is opened and, at step 116, the hardened layers 18, 20, 22, 24 are removed from the compression molding tool. At step 118, the top show layer 26 is coupled (e.g., adhered) to the hardened unitary component opposite the scrim layer 24 to form the load floor panel 10. Top show layer 26 may be, for example, a plastic surface, carpet, or other show surface material. In the illustrated example, top show layer 26 is wrapped around panel edges 34, 36, 38 and tabs 12 of the hardened unitary component and define framing 42 as shown in FIG. 2. Cargo rails 40 may optionally be added in a subsequent step (not shown).

At step 120, load floor panel 10 is loaded onto a measurement device or fixture to obtain precise measurements of the completed load floor panel 10 and assure it is within predetermined tolerances. In particular, the measurement locating members 16 are each positioned onto a locator pin of the measurement fixture (not shown) such that the each locator pin is inserted upward into one cavity 62. At step 122, measurements are taken of the load floor panel. At step 124, the measured load floor panel is removed from the measurement fixture. The process can then be repeated and each new load floor panel is subsequently measured to assure dimensional tolerances are attained.

Conventional panel holding techniques can be affected by improperly dimensioned load floor panels, for example, because the panels are held at the outer edges, which can vary dimensionally from panel to panel. This makes it difficult and/or time consuming to measure a plurality of panels that can each have a different location/orientation in the measurement device.

However, as described in the present disclosure, measurement locating members 16 enable the locator pins to hold panel 10 in the same location and orientation each time, regardless of the dimensions of the load floor panel. As such, with the load floor panel 10 precisely located by the measurement locating members 16, the completed load floor panel 10 can be subsequently measured using conventional measurement techniques to assure dimensional tolerances are met, without being affected by dimensional variations of the load floor panel 10.

Described herein are systems and methods to improve locating a load floor panel for measurement thereof. In one example, the load floor panel is formed using a composite spray molding process. During the forming process, measurement location members are pressed into the load floor panel and the load floor panel is subsequently hardened and retains the measurement location members in the same location every time a new load floor is produced. The completed load floor panels may then be precisely located in a measurement fixture by placing the measurement location members on locator pins of the measurement fixture. This enables the load floor panels to be located in the same position each time in the measurement fixture, thereby enabling quick and extremely precise measurements of the load floor panel or other components fitted with the measurement location members.

It will be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A compression molded vehicle panel, comprising:
   a main body formed by compression molding and having a first side and an opposed second side; and
   at least one separately formed measurement locating member at least partially encapsulated in the main body during the compression molding, the measurement locating member defining a cavity having an open end at the first side of the main body, the cavity configured to receive a locator pin of a measurement fixture to locate the compression molded vehicle panel in the measurement fixture for measurement of the compression molded vehicle panel.

2. The compression molded vehicle panel of claim 1, wherein the main body is a vehicle load floor panel configured to cover a storage compartment of a rear cargo area, and wherein the at least one measurement locating member includes a plurality of measurement locating members.

3. The compression molded vehicle panel of claim 1, wherein the main body comprises a substrate layer disposed between a first layer and a second layer, and a scrim layer disposed on the second layer and at least partially defining the main body first side, the at least one measurement locating member positioned in and extending through the scrim layer.

4. The compression molded vehicle panel of claim 3, wherein each measurement locating member comprises:
   a closed end wall;
   first opposed walls extending from the closed end wall; and
   second opposed walls extending from the closed end wall, the closed end wall and the first and second opposed walls at least partially defining the cavity.

5. The compression molded vehicle panel of claim 4, wherein each measurement locating member further comprises a plurality of retaining members extending from at least one wall of the first opposed walls, each retaining member configured to engage the main body panel and facilitate preventing removal of the measurement locating member from the main body panel.

6. The compression molded vehicle panel of claim 5, wherein each measurement locating member further comprises a flange extending outwardly from a perimeter of the first and second opposed walls, the flange disposed against the scrim layer.

7. The compression molded vehicle panel of claim 3, wherein the first and second layers comprise at least one layer of polyurethane and at least one layer of fiberglass.

8. The compression molded vehicle panel of claim 7, wherein the main body is formed by a composite spray molding process.

9. The compression molded vehicle panel of claim 1, wherein the measurement location member is formed by injection molding.

10. The compression molded vehicle panel of claim 4, wherein the cavity is generally rectangular.

11. The compression molded vehicle panel of claim 5, wherein the plurality of retaining features comprises six generally pyramidal shaped retaining features.

12. A method of manufacturing a compression molded vehicle panel, the method comprising:
providing a main body having a first side and an opposed second side;
providing at least one separately formed measurement locating member defining a cavity;
compression molding the main body and at least partially encapsulating the least one measurement locating member in the main body during the forming of the main body by compression molding to thereby form the compression molded panel, the measurement locating member being located such that the cavity includes an open end disposed at the first side of the main body,
loading the compression molded panel into a measurement fixture having at least one locator pin such that the at least one measurement locating member receives the at least one locator pin; and
measuring dimensions of the compression molded panel while the compression molded panel is loaded in the measurement fixture and located on the at least one locator pin.

13. The method of claim 12, wherein providing a main body comprises:
providing a substrate layer;
disposing a first polyurethane layer on one side of the substrate layer; and
disposing a second polyurethane layer on an opposite side of the substrate layer to form a vehicle load floor panel.

14. The method of claim 13, wherein at least partially encapsulating the least one measurement locating member comprises:
disposing the at least one measurement locating member on at least one pin of a compression molding tool;
loading the substrate layer and first and second polyurethane layers into the compression molding tool; and
closing the compression molding tool such that the at least one measurement locating member is pressed into the first side of the main body during the compression molding.

15. The method of claim 14, wherein providing at least one measurement locating member comprises injection molding at least one measurement locating member comprising:
a closed end wall;
first opposed walls extending from the closed end wall; and
second opposed walls extending from the closed end wall, the closed end wall and the first and second opposed walls at least partially defining the cavity.

16. The method of claim 15, wherein providing at least one measurement locating member comprises injection molding at least one measurement locating member further comprising a plurality of retaining members extending from each wall of the first opposed walls, each retaining member configured to engage the main body and facilitate preventing removal of the measurement locating member from the main body.

17. The method of claim 16, wherein providing at least one measurement locating member comprises injection molding at least one measurement locating member further comprising a flange extending outwardly from a perimeter of the first and second opposed walls, the flange configured to be disposed against the main body first side.

\* \* \* \* \*